(12) United States Patent
Giannozzi et al.

(10) Patent No.: US 9,810,235 B2
(45) Date of Patent: Nov. 7, 2017

(54) MOLD FOR A CENTRIFUGAL IMPELLER, MOLD INSERTS AND METHOD FOR BUILDING A CENTRIFUGAL IMPELLER

(76) Inventors: Massimo Giannozzi, Florence (IT); Iacopo Giovannetti, Florence (IT); Andrea Massini, Florence (IT); Bulent Aksel, Houston, TX (US); Christophe Lanaud, Munich (DE); Julian O'Flynn, Halifax (CA); Scott Finn, Niskayuna, NY (US)

( * ) Notice: Subject to any disclaimer, the term of this patent is extended or adjusted under 35 U.S.C. 154(b) by 1166 days.

(21) Appl. No.: 13/511,627

(22) PCT Filed: Nov. 22, 2010

(86) PCT No.: PCT/US2010/057626
§ 371 (c)(1),
(2), (4) Date: Sep. 28, 2012

(87) PCT Pub. No.: WO2011/063334
PCT Pub. Date: May 26, 2011

(65) Prior Publication Data
US 2013/0011269 A1      Jan. 10, 2013

(30) Foreign Application Priority Data
Nov. 23, 2009  (IT) ............... CO2009A0050

(51) Int. Cl.
*F04D 29/28* (2006.01)
*B29C 45/14* (2006.01)
(Continued)

(52) U.S. Cl.
CPC ...... *F04D 29/289* (2013.01); *B29C 45/14065* (2013.01); *B29C 45/14786* (2013.01);
(Continued)

(58) Field of Classification Search
CPC ........ B29C 45/14786; B29C 45/14065; B29C 2045/14147; B29C 70/48; B22C 7/02;
(Continued)

(56) References Cited

U.S. PATENT DOCUMENTS

| 2,517,477 A | 8/1950 | Griffin |
| 2,868,439 A | 1/1959 | Hampshire et al. |

(Continued)

FOREIGN PATENT DOCUMENTS

| CN | 86101358 A | 12/1986 |
| CN | 2643047 Y | 9/2004 |

(Continued)

OTHER PUBLICATIONS

A Russian Notice of Allowance issued in connection with corresponding RU Application No. 2012122728/02 dated Aug. 26, 2015.
(Continued)

*Primary Examiner* — Matthew Daniels
*Assistant Examiner* — Leith S Shafi
(74) *Attorney, Agent, or Firm* — GE Global Patent Operation

(57) ABSTRACT

A mold for a centrifugal impeller for a turbomachine is provided. The mold comprises at least one annular insert, wherein the annular insert comprises a plurality of aerodynamic vane inserts configured to reproduce an annular assembly of aerodynamic vanes of a finished centrifugal impeller.

13 Claims, 8 Drawing Sheets

(51) Int. Cl.
*B29D 99/00* (2010.01)
*F04D 29/22* (2006.01)
*F04D 29/02* (2006.01)
B29C 70/48 (2006.01)
B29L 31/08 (2006.01)

(52) U.S. Cl.
CPC ....... *B29D 99/0028* (2013.01); *F04D 29/023* (2013.01); *F04D 29/2227* (2013.01); *F04D 29/2294* (2013.01); *F04D 29/284* (2013.01); B29C 70/48 (2013.01); B29K 2713/00 (2013.01); B29L 2031/087 (2013.01); F05D 2230/20 (2013.01); F05D 2300/43 (2013.01); Y10T 29/49337 (2015.01)

(58) Field of Classification Search
CPC ..... B22C 9/04; F04D 29/284; F04D 29/2227; F04D 29/289; F04D 29/023; F04D 29/2294; F04D 29/2222; B29D 99/0028; F05D 2230/20; F05D 2300/43; Y10T 29/49337; B29L 2031/087; B29K 2713/00
USPC ........... 416/223 R; 29/889.71; 425/414, 466; 164/35, 339, 137, 45; 264/516
See application file for complete search history.

(56) References Cited

U.S. PATENT DOCUMENTS

| | | | |
|---|---|---|---|
| 3,189,671 A | 6/1965 | Babb | |
| 3,403,844 A * | 10/1968 | Stoffer | F01D 5/282 156/173 |
| 3,554,668 A | 1/1971 | Wagle | |
| 3,680,979 A | 8/1972 | Hansen et al. | |
| 3,846,045 A | 11/1974 | Mincuzzi | |
| 4,183,719 A | 1/1980 | Bozung | |
| 4,243,199 A * | 1/1981 | Hill | B29C 39/34 249/142 |
| 4,363,602 A | 12/1982 | Martin | |
| 4,435,126 A | 3/1984 | Schneider | |
| 4,676,722 A | 6/1987 | Marchal | |
| 4,697,987 A | 10/1987 | Katayama et al. | |
| 4,747,722 A | 5/1988 | Kawaguchi et al. | |
| 4,747,900 A | 5/1988 | Angus | |
| 4,767,277 A | 8/1988 | Buse | |
| 4,797,064 A | 1/1989 | Ferris et al. | |
| 4,850,802 A | 7/1989 | Pankratz | |
| 4,877,376 A | 10/1989 | Sikorski et al. | |
| 5,022,823 A | 6/1991 | Edelmayer | |
| 5,201,635 A | 4/1993 | Steinmetz | |
| 5,263,823 A | 11/1993 | Cabaret et al. | |
| 5,285,699 A | 2/1994 | Walls et al. | |
| 5,435,960 A * | 7/1995 | Bressler | B29C 33/3842 164/132 |
| 5,449,273 A * | 9/1995 | Hertel | F01D 5/147 205/271 |
| 5,539,395 A | 7/1996 | Buss et al. | |
| 5,632,601 A | 5/1997 | Bodmer et al. | |
| 5,725,353 A | 3/1998 | Matheny et al. | |
| 5,775,878 A | 7/1998 | Maumus et al. | |
| 5,779,449 A | 7/1998 | Klein | |
| 5,795,138 A | 8/1998 | Gozdawa | |
| 5,800,128 A | 9/1998 | Bodmer | |
| 5,845,398 A | 12/1998 | Maumus | |
| 5,944,485 A | 8/1999 | Maumus | |
| 6,025,072 A * | 2/2000 | Goto | B29C 45/0005 428/364 |
| 6,033,183 A | 3/2000 | Genster | |
| 6,033,612 A | 3/2000 | Adams et al. | |
| 6,126,395 A | 10/2000 | Shingai | |
| 6,264,430 B1 | 7/2001 | Hulkkonen et al. | |
| 6,402,467 B1 | 6/2002 | Godichon | |
| 6,481,917 B1 | 11/2002 | Chen et al. | |
| 6,592,329 B1 | 7/2003 | Hirose et al. | |
| 6,805,531 B2 | 10/2004 | Iida et al. | |
| 6,854,960 B2 | 2/2005 | Van Dine | |
| 6,976,828 B2 | 12/2005 | Godichon | |
| 7,491,032 B1 | 2/2009 | Powell | |
| 2004/0224590 A1 | 11/2004 | Rawa | |
| 2005/0100442 A1 | 5/2005 | Clement | |
| 2006/0291996 A1 | 12/2006 | Kubota | |
| 2007/0098556 A1 | 5/2007 | Sanagi et al. | |
| 2008/0298971 A1 | 12/2008 | Pinzauti et al. | |
| 2009/0142196 A1 | 6/2009 | Gerhardt | |
| 2011/0194941 A1 | 8/2011 | Parkin et al. | |
| 2013/0004316 A1 | 1/2013 | Matwey et al. | |
| 2013/0017067 A1 | 1/2013 | Cantelli et al. | |

FOREIGN PATENT DOCUMENTS

| | | |
|---|---|---|
| CN | 101315083 A | 12/2008 |
| CN | 201507475 U | 6/2010 |
| DE | 2027861 A1 | 12/1971 |
| DE | 8519005 U1 | 2/1986 |
| DE | 3711489 A1 | 10/1987 |
| DE | 4139293 A1 | 6/1993 |
| DE | 4409629 A1 | 9/1994 |
| DE | 10039971 A1 | 5/2001 |
| DE | 10104170 A1 | 8/2002 |
| DE | 202005021324 U1 | 10/2007 |
| EP | 0206031 A1 | 12/1986 |
| EP | 0800012 A2 | 10/1997 |
| EP | 0890745 A2 | 1/1999 |
| EP | 0995538 A1 | 4/2000 |
| EP | 2325495 A2 | 5/2011 |
| GB | 1386937 A | 3/1975 |
| GB | 2258032 A | 1/1993 |
| JP | 35020565 Y | 8/1960 |
| JP | 5434107 A | 3/1979 |
| JP | 54028007 A | 3/1979 |
| JP | 56132499 A | 10/1981 |
| JP | 61252895 A | 11/1986 |
| JP | 62279913 A | 12/1987 |
| JP | 6329098 A | 2/1988 |
| JP | 03141898 A | 6/1991 |
| JP | 03210024 A | 9/1991 |
| JP | 03106195 U | 11/1991 |
| JP | 0763193 A | 3/1995 |
| JP | 08224748 A | 9/1996 |
| JP | 094598 A | 1/1997 |
| JP | 09126185 A | 5/1997 |
| JP | 09195987 A | 7/1997 |
| JP | 11324982 A | 11/1999 |
| JP | 11324983 A | 11/1999 |
| JP | 2001124101 A | 5/2001 |
| JP | 2001140789 A | 5/2001 |
| JP | 2004036444 A | 2/2004 |
| JP | 2006161635 A | 6/2006 |
| JP | 2007312576 A | 11/2007 |
| RU | 2113626 C1 | 6/1998 |
| RU | 2231414 C2 | 6/2004 |
| RU | 2239100 C2 | 10/2004 |
| RU | 2280530 C1 | 7/2006 |
| RU | 2280767 C2 | 7/2006 |
| RU | 2290285 C2 | 12/2006 |
| RU | 2296245 C1 | 3/2007 |
| SU | 879045 A1 | 11/1981 |
| SU | 1565574 A1 | 5/1990 |
| SU | 1701984 A1 | 12/1991 |
| WO | 2007037699 A1 | 4/2007 |
| WO | 2009058336 A2 | 5/2009 |

OTHER PUBLICATIONS

A Russian Office Action issued in connection with corresponding RU Application No. 2012122728/02 on Sep. 24, 2014.

An unofficial English translation of the Office Action issued in connection with corresponding KZ Application No. 2012/1556.1 on Dec. 5, 2013.

(56) References Cited

OTHER PUBLICATIONS

An unofficial English translation of the Office Action issued in connection with corresponding KZ Application No. 2012/1557.1 on Dec. 5, 2013.
Notice of Allowance issued in connection with corresponding KZ Application No. 2012/1557.1 dated May 28, 2014.
Unofficial Manual translation of Japanese Office Action issued in connection with corresponding Application No. 2012-541139 on Sep. 24, 2014.
Unofficial English Translation of Japanese Office Action issued in connection with corresponding JP Application No. 2012-541140 on Oct. 21, 2014.
Unofficial English Translation of Japanese Office Action issued in connection with corresponding Application No. 2012-541140 on Feb. 10, 2015.
Search Report and Written Opinion from corresponding PCT Application No. PCT/US2010/57623, dated Mar. 31, 2011.
Search Report and Written Opinion from corresponding PCT Application No. PCT/US2010/57626, dated Apr. 28, 2011.
Search Report and Written Opinion from corresponding Italian Application No. IT MI20090781, dated Nov. 18, 2009.
Search Report and Written Opinion from corresponding Italian Application No. ITCO20090049, dated Jun. 24, 2010.
Search Report and Written Opinion from corresponding Italian Application No. IT CO20090050, dated Jul. 15, 2010.
EP Office Action issued in connection with corresponding EP Application No. 10808954.1 dated Oct. 21, 2016.
Orlov "Thermal Shrink Fit", Shrink-Fitted Joints, pp. 236-237.
Unofficial English Translation of Italian Search Report and Written Opinion issued in connection with related IT Application No. CO20110064 dated Jun. 6, 2012.
PCT Search Report and Written Opinion issued in connection with related PCT Application No. PCT/ EP12/74619 dated Feb. 5, 2013.
Unofficial English Translation of Chinese Office Action issued in connection with related CN Application No. 201080030778.7 dated Oct. 24, 2013.
Unofficial English Translation of Japanese Office Action issued in connection with related JP Application No. 2012-509058 dated Feb. 25, 2014.
U.S. Non-final Office Action issued in connection with related U.S. Appl. No. 13/319,493 dated Jun. 11, 2014.
Unofficial English Translation of Russian Office Action issued in connection with related RU Application No. 2011144881 dated Jul. 30, 2014.
Unofficial English Translation of Italian Search Report and Written Opinion issued in connection with related It Application No. CO2013A000067 dated Sep. 17, 2014.
Unofficial English Translation of Japanese Office Action issued in connection with related JP Application No. 2012509058 dated Oct. 21, 2014.
Unofficial English Translation of Russian Office Action issued in connection with related RU Application No. 2011144881 dated Dec. 23, 2014.
Unofficial English Translation of Chinese Office Action issued in connection with related CN Application No. 201280061611.6 dated Feb. 4, 2015.
PCT search report & Written Opinion issued in connection with related PCT Application No. PCT/EP2014107707 dated Mar. 26, 2015.
Unofficial English Translation of Japanese Office Action issued in connection with related JP Application No. 2012509058 dated Aug. 4, 2015.
Unofficial English Translation of Russian Office Action issued in connection with related RU Application No. 2011144881 dated Sep. 21, 2015.
Unofficial English Translation of Japanese Notice of Allowance issued in connection with related JP Application No. 2012509058 dated Feb. 23, 2016.
Unofficial English Translation of Japanese Office Action issued in connection with related JP Application No. 2014546420 dated Sep. 20, 2016.
Unofficial English Translation of Russian Office Action issued in connection with related RU Application No. 2014121784 dated Sep. 27, 2016.
U.S. Non-Final Office Action issued in connection with corresponding U.S. Appl. No. 14/365,253 dated Dec. 27, 2016.
Unofficial English Translation of Russian Office Action issued in connection with related RU Application No. 2014121784 dated Jan. 30, 2017.
U.S. Non-Final Office Action issued in connection with related U.S. Appl. No. 14/642,844 dated Feb. 17, 2017.
Unofficial English Translation of Japanese Office Action issued in connection with related JP Application No. 2014546420 dated Mar. 14, 2017.

* cited by examiner

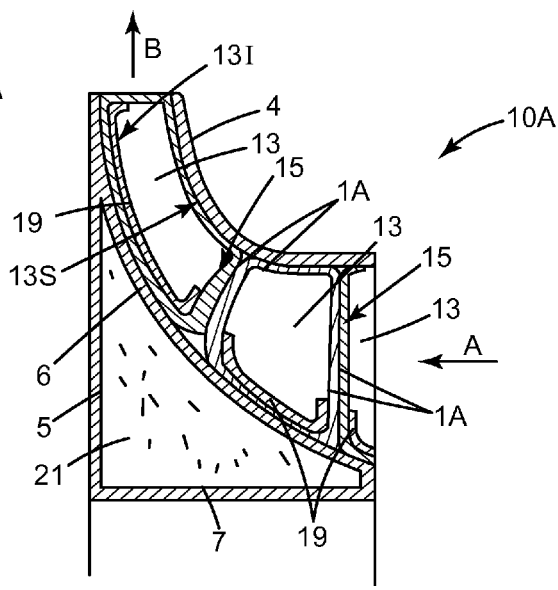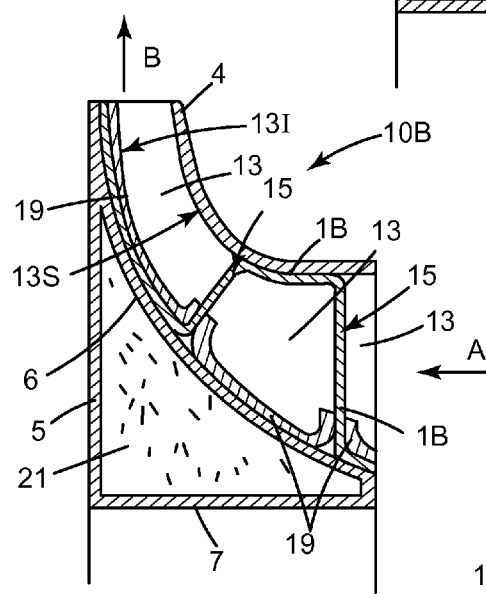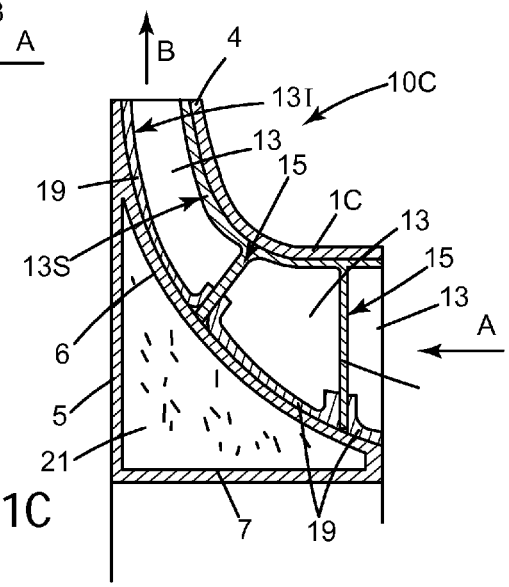

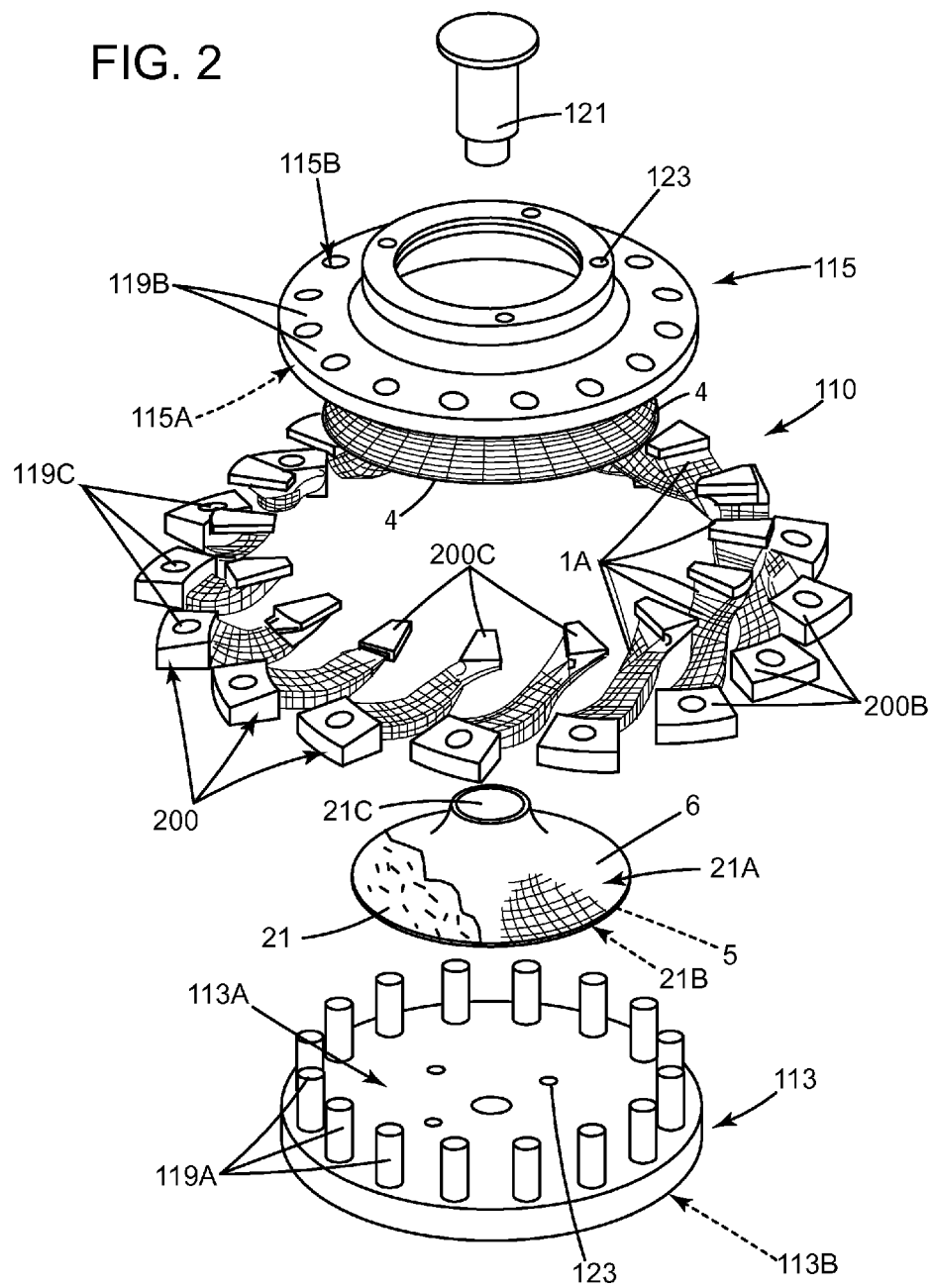

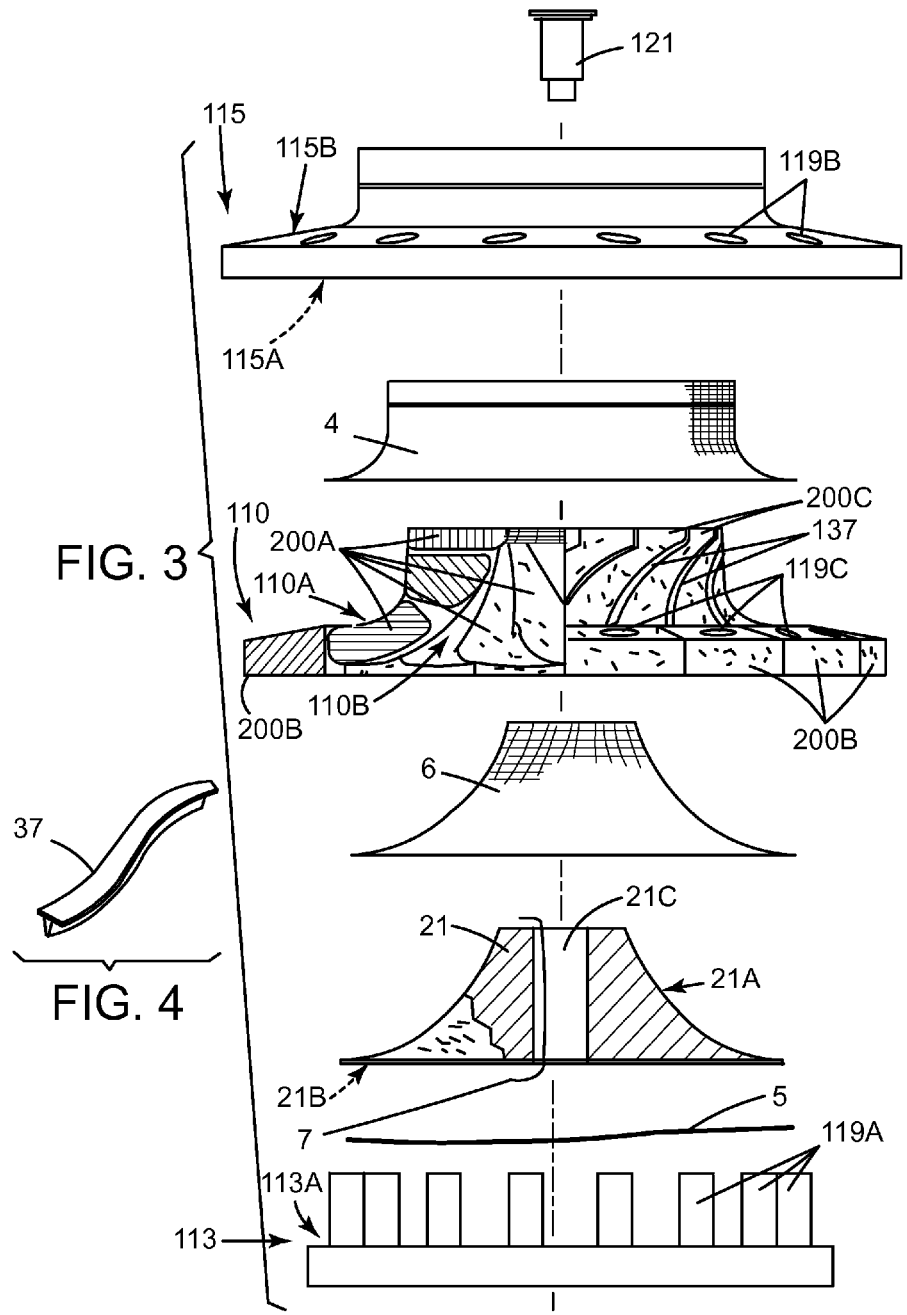

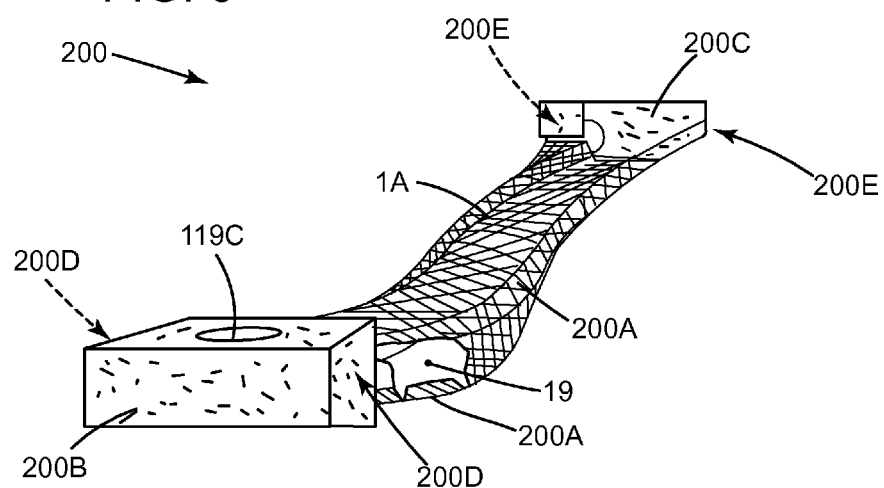
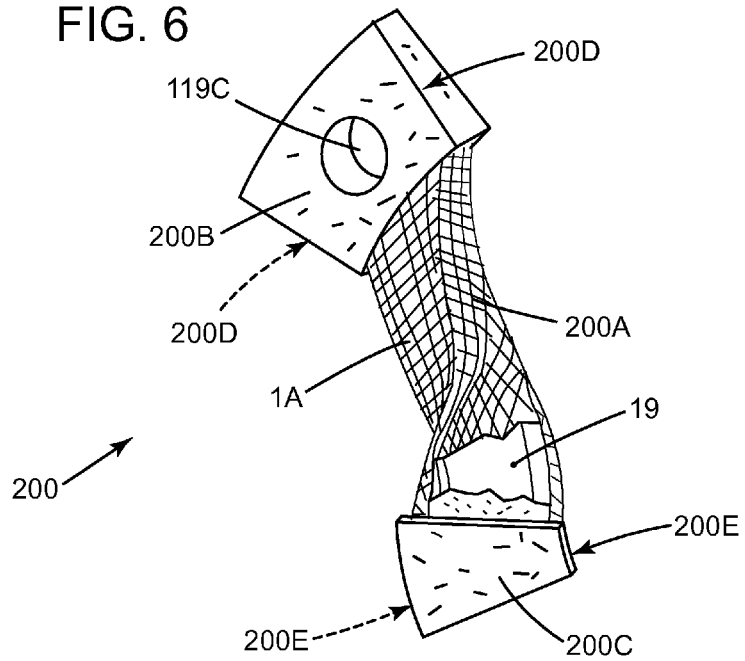

MOLD FOR A CENTRIFUGAL IMPELLER, MOLD INSERTS AND METHOD FOR BUILDING A CENTRIFUGAL IMPELLER

CROSS REFERENCE TO RELATED APPLICATIONS

This is a national stage application under 35 U.S.C. §371(c) of prior-filed, co-pending PCT patent application serial number PCT/US2010/057626, filed on Nov. 22, 2010, which claims priority to Italian Patent Application Serial No. CO2009A000050, filed on Nov. 23, 2009, the entire contents of which are incorporated herein by reference.

BACKGROUND OF THE INVENTION

Field of the Invention

Embodiments of the invention relate to composite centrifugal impellers for turbomachines and related production methods, particularly, but not exclusively, for oil and gas applications.

Other embodiments generally relate to a mold for producing this centrifugal impeller, some particular components to make this centrifugal impeller with this mold, and a turbomachine in which said impeller could be used.

Description of the Related Art

A component of a centrifugal turbomachine is the centrifugal impeller, which transfers, in general, energy from the motor that drives the turbomachine to a working fluid being compressed or pumped by accelerating the fluid outwards from the center of rotation; the kinetic energy imparted by the impeller to the working fluid is transformed into pressure energy when the outward movement of the fluid is confined by a diffuser and the machine casing. This centrifugal machine is called, in general, a compressor (if the working fluid is gas) or a pump (if the working fluid is a liquid).

Another type of centrifugal turbomachine is an expander, which uses the pressure of a working fluid to generate mechanical work on a shaft by using an impeller in which the fluid can be expanded.

U.S. Pat. No. 4,676,722 describes a wheel for a centrifugal compressor made by a plurality of fiber loaded scoops. A disadvantage of this particular impeller is that the various scoops have direct fiber reinforcement substantially in the radial direction, so it is difficult to balance circumferential stress as generated by centrifugal forces at a high speed of rotation. After manufacturing, the sectors are joined to each other by the adhesive strength of a bonding agent, which limits the maximum speed of operation. Also, the method of manufacture, in which the assembly is drawn into place by filaments, is restricted to relatively simple geometries (e.g. with straight-edged sectors) which may have low aerodynamic efficiency.

U.S. Pat. No. 5,944,485 describes a turbine of thermostructural composite material, particularity one of large diameter, and a method for manufacturing the turbine that provides mechanical coupling for its assembly by means of bolts, grooves, slots, and so on. A disadvantage of this impeller is that the mechanical coupling cannot ensure a high resistance at high rotational velocity when using either a corrosive or erosive working fluid. Therefore the reliability of this component may decrease dramatically. In addition, the scheme for attaching the airfoil to the hub provides user continuous fibers around the internal corners of the passages. Since these are typically areas of high stress, it is desirable to have fibers that are continuous from the airfoil to the cover and from the airfoil to the hub.

U.S. Pat. No. 6,854,960 describes a segmented composite impeller or propeller arrangement and a manufacturing method. The main disadvantage of this impeller is that it relies on adhesive bonding to join identical segments. As a result, it does not have a high mechanical resistance to work at high rotational velocity, and centrifugal forces can separate identical segments and destroy the impeller itself. Another disadvantage is that it is not possible to build an impeller with vanes with complex geometry, as is the case with three dimensional or similar impellers.

In general, a disadvantage of all the aforesaid impellers is that they present a relatively complex mechanical structure, because they are composed of several different components that need to be made independently and then mechanically assembled together. Moreover, the components made of fibers have to be built in general by expensive metal molds, increasing the cost of manufacture. Also, different metal molds have to be used to build these fiber components for each different type of impeller, which significantly increases the cost of manufacture. Again, these mechanical assemblies are not easily achievable by means of automated machinery, further increasing the lime and cost of manufacture.

Another disadvantage is that the vanes of these impellers are not protected in any way from solid or acid particles suspended in the working flow, therefore erosion and corrosion problems could be significant and may lead to the destruction of the component.

Yet another disadvantage is that it may be difficult to achieve the mechanical assembly of all the components needed for optimal operations of the impeller at high speed. Moreover, any distortion produced by the tensions and forces created during use can cause problems during operation, especially at high speed; vibrations may occur during operation, caused by wear and/or by a faulty assembly of various components. Therefore, the impeller may fail.

To date, notwithstanding the developments in technology, these disadvantages pose a problem and create a need to produce simple and inexpensive centrifugal impeller for turbomachinery in an even faster and less expensive way, while at the same time producing an improved and high quality finished product. A particular need exists to produce an innovative centrifugal impeller by taking advantage of composite and fiber technologies, whilemostly preserving the mechanical, fluid-dynamic and aerodynamic properties of metallic impeller, in order to effectively use this innovative impeller in the turbomachinery field. Design improvements are needed to take greater advantage of the inherent strengths of composites, and to enable safe operation at higher tip speeds than is possible with typical metallic impellers.

BRIEF SUMMARY OF THE INVENTION

According to an embodiment of the invention, a mold for a centrifugal impeller for a turbomachine is provided. The mold comprises at least one annular insert wherein the at least one annular insert comprises a plurality of aerodynamic vane inserts configured to reproduce aerodynamic vanes of a finished centrifugal impeller.

According to another embodiment of the invention, an aerodynamic vane insert is provided. The aerodynamic vane insert is configured to reproduce at least an aerodynamic vane of a finished centrifugal impeller.

According to another embodiment of the invention, a method for building a centrifugal impeller for a turbomachine is provided. The method comprises: fabricating an annular insert, the annular insert comprising a plurality of aerodynamic vane inserts; and reproducing aerodynamic vanes of the finished centrifugal impeller.

BRIEF DESCRIPTION OF THE DRAWINGS

Other objects, features and advantages of the embodiments of the present invention will appear on reading the following description, given only as a non-limiting example, and made with reference to the appended drawings in which:

FIGS. 1A, 1B and 1C show cross-sections of an impeller according to different embodiments;

FIG. 2 shows an exploded assembly of a mold according to one embodiment of the invention;

FIG. 3 shows a lateral and exploded view of a mold similar to FIG. 2;

FIG. 4 shows a component for the mold of FIG. 3;

FIGS. 5 and 6 show a plurality of views of a component of the mold of FIG. 2 or 3;

FIGS. 9A, 98 and 9C show a respective fiber element according to particular embodiments of the invention;

FIGS. 11A to 11L show a plurality of fibers used with different embodiments of the invention.

DETAILED DESCRIPTION OF THE INVENTION

Figure 7:
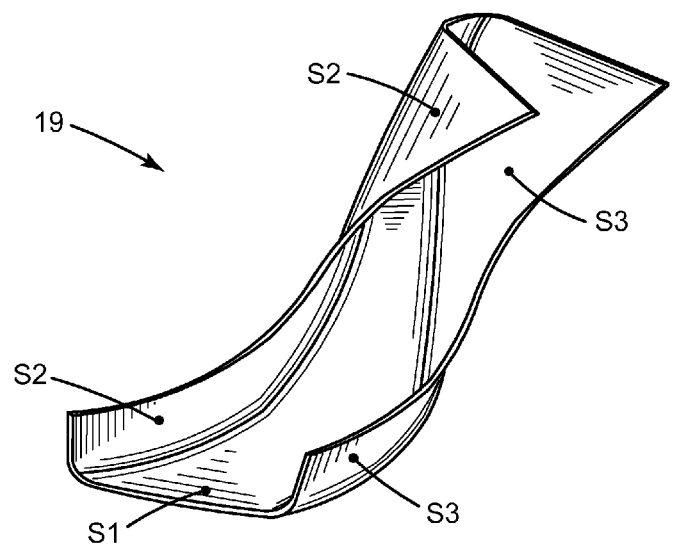
FIGS. 7 and 8 show other components according to particular embodiments of the invention.

Generally, embodiments of the present invention produce a simple, fast and cheap mold for building a centrifugal impeller, overcoming at least some of the drawbacks mentioned above.

The aerodynamic vanes are the empty spaces between adjacent blades. During the use of the impeller, the working fluid enters into an inlet eye of each aerodynamic vane, passes through the vane, in which the fluid is pushed radially by the geometry of the vane itself and by the rotation of the impeller, and finally goes out through an eye outlet of each vane.

In an embodiment of the subject matter disclosed, first fabric elements are configured to surround each aerodynamic vane in order to substantially reproduce the shape of the aerodynamic vane such that the aerodynamic characteristics of said vane are preserved.

In another embodiment of the present invention, a second fabric element is configured to alternately surround an upper wall of a vane and a lower wall of an adjacent vane passing along the respective blade therebetween such that the aerodynamic characteristics of said vane are preserved.

In another embodiment, a third fabric element has a substantially conical surface with fabric blades stretching out from the surface; these fabric blades being able to reproduce substantially the blades of the finished impeller.

The above-described embodiments could be realized in different was according to specific needs of manufacturing or use; also, it does not exclude realizing these embodiments in combinations with each other.

In another embodiment, a shaped component is associated inside each of the aerodynamic vanes in order to act against the erosion or corrosion phenomena caused by the working fluid.

In another embodiment, the impeller comprises a fourth fabric element placed over the aerodynamic vanes; this fourth fabric element could substantially have a centrifugal shroud shape and function.

The impeller could comprise a fifth fabric element having substantially an annular planar shape that realizes substantially a rear-plate for the impeller itself.

A sixth fabric element could be fitted under the aerodynamic vanes; this element has substantially an annular shape and is able to be matched with the external inferior surface of the vanes.

A seventh fabric element could be fitted around an axial hole inside which a rotor of the turbomachine fits. The fourth, fifth, sixth and seventh fabric elements could be provided in combination with each other to increase the mechanical resistance of the finished impeller; however, it must be understood that these fabric elements could be used alone or in various combinations according to the specific needs of manufacturing or use.

In an embodiment of the present invention, all the aforesaid fabric elements, when provided, are enclosed or associated in the filling material, typically called "matrix", in order to obtain a more rigid shape for the impeller.

In an embodiment, all of the aforesaid fabric elements, when provided, are matched or pressed together in order to minimze the empty spaces between them. In this case, the filling material used to fill the spaces between adjacent fiber elements is reduced as much as possible, in order to maximize the amount of structural fiber within the volume. This will further increase the mechanical resistance of the finished impeller.

In a further embodiment, an inner core element is placed under the aerodynamic vanes in order to facilitate the manufacturing process of the impeller, in particular to facilitate the deposition of the said fourth, fifth, sixth, and seventh fiber elements in place, and, when provided, providing a base for the fiber deployment. Also, the core element could be configured to give a higher strength and stiffness during the work of the finished impeller at high rotational velocities.

In an embodiment of the present invention, the core consists of unfilled cavities that decrease the overall density of the core, so that it is substantially lower than that of the fabric or filling material. This will result in lower forces on the adjacent structure when subjected to high rotational velocities.

The core could also be surrounded, in part, by at least one of the aforesaid fabric elements, alone or in various combinations, when provided, in order to obtain a particularly compact, rigid and resistant system.

According to another embodiment of the present invention, the above fabric elements are made by a plurality of unidirectional or multidirectional fibers, realized substantially to have a high anisotropy along at least a preferential direction. These fibers could have a substantially thread-like shape, as for example carbon fibers, glass fibers, quartz, boron, basalt, polymeric (such as aromatic polyimide or extended-chain polyethylene) polyethylene, ceramics (such as silicon carbide or alumina) or others.

It does not exclude, however, that these fabric elements could be realized with two or more layers of fibers, with a combination of fibers of different types or with different types of elements, as for example with granular, lamellar or spheroidal elements or woven, stitched, braided, non-crimp or other fabrics, unidirectional tapes or tows, or any other fiber architectures.

An impellers created according to embodiments of the present invention present high quality and innovative characteristics. The impeller is extremely light while, at the same time, has a comparable resistance with respect to the known impeller made of metal used in the turbomachine field (for high rotational velocity and for high pressure ratio). In fact, a traditional metallic impeller could weigh from about 10 to 2000 kg depending on the impeller size, and the impeller according to the invention could weigh from about 0.5 to 20 kg (for the same type of impeller). Therefore, the weight reduction is greater than 75%.

Also, an impeller made according to embodiments of the present invention could be used with a lot of different fluids (liquid, gas or a mixture thereof) and with fluids that present high corrosive or erosive characteristics.

Embodiments of the present invention are also particularly inexpensive and simple to produce and to handle. Also, it is particularly easy to apply more components or elements to improve the quality or the mechanical characteristics of the impeller according to specific requirements, like the shaped components or fiber elements made by specific shape or other.

An impeller made according embodiments of the present invention could be of different types, preserving at the same time aerodynamic and mechanical characteristics For example, the impeller could be a three dimensional impeller, a two dimensional impeller, or others.

Embodiments of the present invention also provide a turbomachine wherein at least a centrifugal impeller as described above is implemented.

In particular, the turbomachine could be a centrifugal compressor (for gas) or pump (for liquid), or else it could be a centrifugal expander; in any case, the turbomachine has a plurality of these impellers associated on a common shaft in metal or other material (for example a composite material).

Embodiments of the present invention also provide a mold to build a centrifugal impeller for a turbomachine comprising of, at least, an annular insert comprising a plurality of aerodynamic vane inserts reproducing the aerodynamic vanes of the finished impeller.

In particular, the annular insert could be made by a single piece, or by joining together a plurality of pieces.

According to embodiments of the present invention, the mold comprises a base plate having an internal face and an external face, the internal face being configured to reproduce a rear-surface of the impeller and the external face being substantially opposite to the internal face; an upper-ring having an internal face and an external face, the internal face being configured to reproduce a front-surface of the impeller and the external face being substantially opposite to the internal face.

In other embodiments, the mold comprises the aforesaid fabric elements having a (semi) rigid shape and being made separately before placed inside the mold.

According to embodiments of the present invention, the mold comprises the inner core associated under the centrifugal impeller preform and over the base plate; the inner core could be realized in numerous different embodiments according to different technical needs or requirements of use.

In another embodiment of the present invention, the mold comprises a plurality of shaped components able to be associated on an external surface of each aerodynamic vane insert; these shaped components are configured to act against the erosion or corrosion of the working fluid during the work of the finished impeller.

In particular, these shaped components could be associated between one of the aforesaid fabric elements and the surfaces of the annular insert corresponding to the walls of the vanes, in a position where the erosion or corrosion process caused by the working fluid is higher.

A closure system could be provided to close the preform between the base-plate and the upper/ring, in order to center and lock said impeller preform between them. This system could be realized in a plurality of different types, for example in a mechanical system (centering pins, screws or others), a geometrical system (shaped holes, shaped grooves, shaped teeth, shaped surfaces or others), or others systems.

An injection system is provided to inject the filling material inside the mold by means of injection channels made inside the base plate and/or the upper-ring.

The mold according to embodiments of the present invention produces a high quality finished impeller and has innovative characteristics for the turbomachinery field. Also, the material used for the annular insert could be something low-cost and easy to machine, such as high-density foam or ceramic. Moreover, the material is very compact and yet extremely versatile, because it is possible to make a lot of different types of impellers providing an annular insert with specific geometry and shape (in particular three or two dimension impellers).

The mold design also allows for a single-step infusion and cure of the filling material through the entire part. This provides for a high strength part and eliminates the need for secondary joining operations such as bonding, machining, or mechanical attachment which can be costly and time-consuming. In addition, the possibility for part contamination or handling damage between operations is eliminated.

Embodiments of the present invention also provide an aerodynamic vane insert configured to reproduce at least an aerodynamic vane of the finished centrifugal impeller such that the aerodynamic characteristics of the vane of the finished impeller are preserved.

The aerodynamic vane insert comprises at least a central region configured to properly reproduce the aerodynamic vane and end-regions configured to be associated with end-regions of an adjacent insert forming the annular assembly.

According to embodiments of the present invention, these shaped end-regions are configured to be associated with end-regions of an adjacent insert in order to create the inlet and respective outlet eyes for the working fluid and for handling, positioning the insert within the mold, and containing resin channels. The shaped end-regions could also be provided with sealing elements to avoid a leakage during the injection of the filling material.

In an embodiment, the aerodynamic vane inserts are made by at least a single piece; however it does not exclude that the inserts could be made of two or more pieces or, on the contrary, a single insert could produce two or more aerodynamic vanes according to the particular embodiments.

Embodiments of the present invention allow for the fabrication of vanes with complex 3D geometry such that the inserts can readily be removed from the impeller after the filling material has cured.

According to another exemplary embodiment, an aerodynamic vane insert is joined with other vane inserts to form an annular assembly reproducing of all the aerodynamic vanes of the finished impeller such that the aerodynamic characteristics of the vanes of the finished impeller are preserved. This annular insert could be made also by a single piece.

In an embodiment, the annular insert comprises a first face, a second face, a plurality of shaped slots, and an axial hole. The first face is configured to reproduce the upper surface of the annular assembly of all the aerodynamic vanes of the finished impeller; the second face is substantially opposite to the first face and configured to reproduce the lower surface of the aforesaid annular assembly; the plurality of shaped slots are provided to reproduce substantially the lateral walls of the vanes; and the an axial hole reproduces substantially the axial hole of the finished impeller in which a rotor of the turbomachine is placed.

The aerodynamic vane insert and the annular insert can be made by an appropriate material according to the fabrication process or the type of finished impeller, and it could be a soluble or breakable material, a reformable material, or a solid material that can be extracted in multiple pieces, such as, but not limited to, metal, ceramic, polymer, wood, or wax. Some specific examples include water soluble ceramics (for example Aquapour™ from Advanced Ceramics Manufacturing), state-change materials (for example "Rapid Reformable Tooling Systems" from 2Phase Technologies), shape memory polymers (for example Veriflex® Reusable Mandrels from Cornerstone Research Group).

The aerodynamic vane inserts and the annular insert according to embodiments of the present invention are able to build a finished impeller of high quality and with innovative characteristics for the turbomachinery field.

The aerodynamic vane inserts and the annular insert are also extremely versatile, because it is possible to make many different types of aerodynamic vanes providing a specific geometry and shape thereof, for example impeller of two or three dimensional types, or others.

Also, the finished impeller could be made in a single injection and does not require subsequent assembly, and bonding. This reduces manufacturing time and improves the structural integrity of the part. However, it does not excluded injecting and curing each vane individually and then combining these vanes in a subsequent step with the hub and shroud.

In the drawings, in which the same numbers correspond to the same parts in all the various Figures, a finished centrifugal impeller for a turbomachine according to an embodiment of the invention is indicated generically with the numeral 10A, see FIG. 1A. This impeller 10A comprises a plurality of aerodynamic vanes 13 formed between aerodynamic blades 15 made by first fabric elements 1A (see also FIG. 9A) and impregnated with a first filling material M, typically referred to as a "matrix".

The above filling material could be realized by a material able to hold together, to evenly distribute the tensions inside, and to provide high resistance to high temperatures and wear for the fabric elements. The fabric elements are able mainly to provide high resistance to the tensions during the work of the impeller. Furthermore, the filling material can be arranged to present a low specific mass or density in order to reduce the weight of the impeller and thus the centrifugal force generated during the work.

The filling material could be an organic, natural or synthetic polymer material, whose main components are polymers with high molecular weight molecules, and which are formed by a large number of basic units (monomers) joined together by chemical bonds. Structurally, these molecules may be formed from linear or branched chains, tangled with each other, or three-dimensional lattices, and mainly composed of carbon and hydrogen atoms and, in some cases, oxygen, nitrogen, chlorine, silicon, fluorine, sulfur, or others. In general, polymeric materials are a very large family of hundreds and hundreds of different substances.

One or more auxiliary compounds can also be added to the polymer materials, such as micro- or nanoparticles, which have different functions depending on the specific needs. For example, to strengthen, toughen, stabilize, preserve, liquefy, color, bleach, or protect the polymer from oxidation.

In an embodiment of the present invention, the polymer filling material is constituted, at least in part, from a thermoplastic polymer such as PPS (polyphenylene sulphides), PA (polyamide or nylon), PMMA (or acrylic), LCP (liquid crystal polymer), POM (acetal), PAI (polyamide imide), PEEK (poly-ether-ether-ketone), PEKK (poly-ether-ketone-ketone), PAEK (poly-aryl-ether-ketone), PET (Polyethylene tereptalato), PC (poly carbonate), PE (polyethylene), PEI (Poly-ether-imide), PES (polyether), PPA (poliptalamide), PVC (polyvinyl chloride), PU (polyurethane), PP (polypropylene), PS (polystyrene), PPO (polifenilene oxide), PI (polyimide; exist as thermosetting), or more. For particularly high temperature applications various polyimides such as polymerized monomeric reactant (PMR) resins, 6F-Polyimides with a phenylethynyl endcap (HFPE), and phenylethynyl-terminated imide (PETI) oligomers may be preferred.

It's clear that the number and the shape of the fabric elements, the aerodynamic blades, and the corresponding vanes will vary depending on the particular embodiment of the impeller. See description above.

It must be understood that, in this description and in the attached claims, the term "fabric" is used to imply a number of one or more of a variety of different fibrous structures woven into a pattern, such as a braid pattern, a stitched pattern, or an assembly of layers (and not woven arrangements only). The fabric comprises fibers that are continuous around the entire internal surface of each vane thereby providing a high resistance to mechanical stresses generated at these locations. In this way a single vane becomes particularly resistant to the mechanical stress and at the same time is able to preserve its aerodynamic characteristics.

In another embodiment of the present invention, the polymer filling material is at least partly constituted of a thermosetting polymer, such as Epoxy, phenolic, polyester, vinylester, Amin, furans, PI (exist also as thermoplastic material), BMI (Bismaleimides), CE (cyanate ester), Pthalanonitrile, benzoxazines or more. For particularly high temperature applications various thermosetting polyimides such as polymerized monomeric reactant (PMR) resins, 6F-Polyimides with a phenylethynyl endcap (RFPE), and phenylethynyl-terminated imide (PETI) oligomers may be preferred.

According to another embodiment of the invention, the filling material is composed of a ceramic material (such as silicon carbide or alumina or other) or even, at least in part, from a metal (such as aluminum, titanium, magnesium, nickel, copper or their alloys), carbon (as in the case of carbon-carbon composites), or others.

A working fluid enters in the inlet eye of each vane 13 along an incoming direction A, goes through the vane 13, and goes out from the outlet eyes of the same vane along a direction B.

A shaped component 19—shown not to scale in FIG. 1A—is disposed on an inferior wall 13I of the vane 13 between each blade 15 to prevent the erosion of the working fluid during the work of the impeller 10A. The working fluid could be a gas, a liquid or in general a mixture thereof, and the erosion or corrosion process could be aggravated by the high rotational speed of the impeller, which causes the liquid or solid particles in the flow to strike the blade with higher force. A fourth fabric element 4 is advantageously provided over the vane 13 having substantially a centrifugal shroud shape and function. An inner core element 21 is associated under the vanes 13 and could be surrounded by a plurality of further fabric elements 5, 6, 7. See description below.

The core could be made at least by a material more rigid than the filling material before it's cured, for example: wood (for example balsa), foam (for example epoxies, phenolics, polypropelyne, polyurethane, polyvinyl chloride PVC, acrylonitrile butadiene-styrene ABS, cellulois acetate), honeycomb (for example kraft paper, aramid paper, carbon or glass reinforced plastic, aluminum alloys, titanium, and other metal alloys), polymers (for example phenolics, polyimides, polyetherimides, polyetheretherketones), or metallic materials or others.

In the embodiment, (see also description of the FIG. 7) this shaped component 19 reproduces substantially the shape of the inferior walls 13I of the vane 13 where the erosion process caused by the flow of the working fluid could be higher; however it's not to exclude that these components 19 could be made with another shape or other materials. See description below.

FIG. 1B shows a second embodiment in which an impeller 10B is provided with a second fabric element 1B (see also description of FIG. 9B) configured to surround alternately an upper wall of a vane 13 and a lower wall of an adjacent vane 13 passing along the respective blade 15 therebetween.

FIG. 1C shows a third embodiment in which an impeller 10C is provided with a third fabric element 1C (see also description of FIG. 9C) configured to form the blades 15 and a superior wall 13S of the vane 13 between each blade 15; the third fabric element 1C is composed substantially by an annular plate with a plurality of shaped sheets stretching out from the plate to form the blades.

In both of the embodiments 10B and 10C could be provided the same elements described for in the first embodiment of FIG. 1A, as shown in the Figures themselves, as the shaped component 19, the inner core 21, and others.

FIG. 2 shows an exploded view of a mold 100 to build said centrifugal impeller 10A, 10B or 10C which comprises basically an annular insert 110 (shown itself in exploded view in this Figure) and the inner core element 21 between a base plate 113 and an upper-ring 115.

The annular insert 110 is made, in this particular embodiment, by associating a plurality of aerodynamic vane inserts 200, each of them reproducing an aerodynamic vane 13 of the finished impeller, to form an assembly substantially annular or toroidal. See below.

The base plate 113 has an internal face 113A configured to reproduce a rear-surface of the finished impeller 10A, 10B or 10C and an external face 113B being substantially opposite to the internal face 113A. The upper-ring 115 has an internal face 115A configured to reproduce a front-surface of the impeller and an external face 115B substantially opposite to the internal face 115A.

The inner core element 21 is associated under the annular insert 110 and presents a first face 21A (see also FIGS. 2, 3 and 9), an opposed second face 21B and an axial hole 21C. The first face 21A has advantageously a shroud form, similar to a bell, or a tulipan configured to match the inferior surface of the preform 110. The opposed second face 21B is configured to reproduce substantially the rear-surface of the finished impeller and the axial hole 21C is able to be associated on a shaft R of a machine where the finished impeller can be installed.

In this drawing, the core element 21 is surrounded by a fifth fiber element 5, a sixth fiber element 6, and a seventh fiber element 7. See below.

It has to be noted that in these drawings the shape of the core element 21 is presented to fill completely the space between the shaft and the preform 110. It does not exclude realizing the core element 21 to fill partially this space in order to decrease the stress and at the same time the weight of the finished impeller.

In another advantageous embodiment, these further fabric elements 5, 6, 7 could be not provided when the core element 21 is made by metallic material.

In addition, shaped cavities or holes could be provided on the core element 21 made by metallic material and inserted with part of the fabric elements to fix more stably these elements on it.

Furthermore, FIG. 2 shows a closure system 119 comprising—in this advantageous embodiment—a plurality of closure pins 119A fixed on the edge of the internal face 113A of the base plate 113 and with corresponding closure holes 119B made on the edge of the internal face 115A of the upper-ring 115. Insertion holes 119C are provided on each aerodynamic vane insert 200 in a particular position, see description below. It's clear that the closure system 119 is described here as an example of a realization; this system can vary enormously depending on the particular embodiment.

Furthermore, FIG. 2 shows an axial insert 121 which passes through the axial hole 21C of the finished impeller made with a specific material, eventually the same material of the perform 110 and/or of the inserts 200.

It has to be noted that FIG. 2 shows also a plurality of first fabric elements 1A, each of them associated on the external surface of a respective aerodynamic vane insert 200. The mold 100 could be comprised also of the second and third fabric element 1B and respectively 1C (not shown in FIG. 2 for simplicity) to realize the finished impeller shown schematically in FIG. 1B and respectively 1C.

FIG. 3 shows an exploded and lateral view of a mold similar to that of FIG. 2 in which the inserts 200 are associated together to form the annular insert 110. The Figure does not show the first fabric element 1A nor the second or third fabric element 1B and 1C for simplicity.

However, FIG. 3 does show the forth, fifth and sixth fabric elements 4, 5, 6 that could be provided inside the mold 100 to form the finished impeller in an advantageous embodiment of the invention.

In particular, the fourth fabric element 4 is configured to be associated between the annular insert 110 and the upper-ring 115; the fifth fabric element 5 is configured to be associated between the core 21 and the internal face 113A of the base plate 113; the sixth fabric element 6 is configured to be associated between the annular insert 110 and the core 21; the seventh fabric element 7 is configured to be associated inside the axial hole 21C of the core 21. These fabric elements 4, 5, 6, 7 could be impregnated with the first filling material M during the manufacturing process.

Moreover, in FIG. 3, the annular insert 110 is partially shown in section and configured to reproduce an annular assembly of a plurality of aerodynamic vanes of the finished impeller such that the aerodynamic characteristics of the finished impeller are preserved.

In a preferred embodiment, the annular insert 110 comprises a first face 110A made by the upper surface of the vanes annular assembly and having substantially a form similar to a bell or a tulipan, and able to be matched with the fourth fabric element 4. A second face 110B is substantially opposite to the first face 110A and made by the lower surface of the vanes annular assembly; a plurality of shaped slots 137 are provided to reproduce substantially the blades 15 of each vane 13 and the axial hole 21C being able to be associated to the rotor R of the turbomachine.

This annular insert 110 could be made by joining to each other a plurality of said aerodynamic vane inserts 200 (as shown in these Figures) or by a single piece, as said above.

FIG. 4 is a schematic view of a segmented fabric element 37 (see also FIG. 1A) able to be fitted inside the space at the corner of said shaped slots 137. The segmented fabric element 37 increases the rigidity of the whole assembly of the finished impeller, eliminates preferential flowpaths for the filling material, and avoids regions containing only filling material with no fiber where cracking might initiate during cure.

In a preferred embodiment, all the fabric elements 1 to 7 and 37 are made by fabric material that present soft or (semi) rigid features, so that they can be made separately and associated together while assembling the mold. The fabric material however could be made by other types according to different embodiments or needs of use of the finished impeller. Furthermore, these fabric elements could be made of different types of fiber material according to different embodiments.

FIGS. 5 and 6 are schematic views of the aerodynamic vane insert 200 according to an advantageous embodiment of the invention. The embodiment comprises a central region 200A configured to reproduce a vane 13 of the finished impeller and opposite shaped end regions 200B, 200C configured to be associated with shaped end regions 200B and respectively 200C of an adjacent vane insert 200 to arrange the annular assembly realizing the annular insert 110. In particular, the end regions 200B, 200C comprise a lateral surfaces 200D and respectively 200E are able to engage with the lateral surfaces 200D and respectively 200E of the adjacent vane insert 200. Advantageously, the opposite shaped end regions 200B, 200C reproduce the inlet eye and respectively the outlet eye of the vane 13. Furthermore, in this particular embodiment, the end regions 200B, 200C are shaped in order to match with end regions of an adjacent insert 200 and, at the same time, for handling and positioning the vane insert 200 within the mold 100. The form and the shape of these end regions 200B, 200C could be changed according to the particular embodiments of the invention. Although the vane insert 200 shown here represents a three-dimensional vane, the insert 200 could be made according to other different types, for example a two-dimensional vane or other.

FIG. 7 is a schematic view of the shaped element 19 according to an advantageous embodiment of the invention, capable of covering the portion of a vane 13 of the finished impeller where the erosion process is higher, for example the bottom part thereof (see FIG. 1A).

In particular, this shaped element 19 is realized by a first surface S1 able to reproduce the shape of and to be associated on the inferior wall 13I of a vane 13, see also FIG. 1A; and by lateral edges S2 and S3 to reproduce partially the shape of and to be associated on the lateral walls of the blades 15 inside the vane 13. Advantageously, this shaped element 19 can be associated on the central region 200A of the vane insert 200 and enclosed by the first, second or third fabric elements 1A, 1B or 1C, see also FIGS. 5 and 6.

Figure 8:
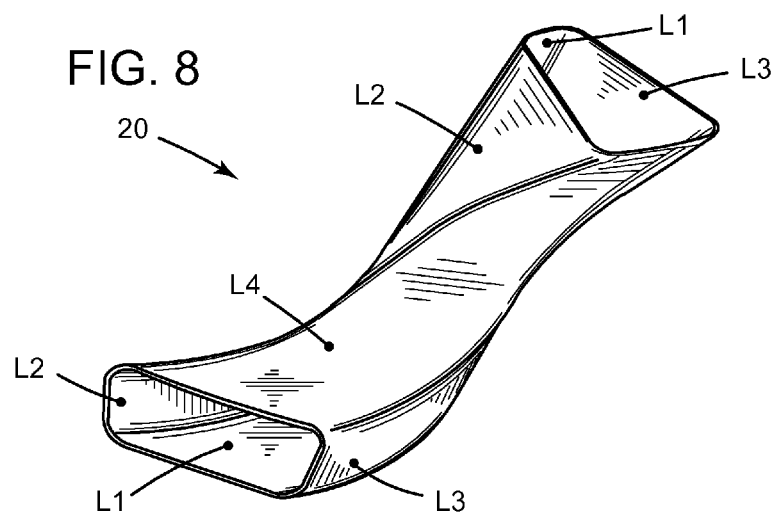

FIG. 8 shows a shaped component 20 that is capable of covering the walls of the vane 13 completely. In other words, this shaped component 20 forms substantially a closed channel able to reproduce entirely the vane 13 in which the working fluid flows. In particular, this shaped element 20 is realized by a first inferior surface L1 able to reproduce the shape of and to be associated on the inferior wall 13I of a vane 13; by lateral edges L2 and L3 to reproduce the shape of and to be associated on the lateral walls of the blades 15 inside the vane 13 and by a second superior surface L4 to reproduce the shape of and to be associated on the superior wall 13S of a vane 13.

At the same time, the shaped element 20 can be associated on the central region 200A of the insert 200 and enclosed by the first, second or third fabric element 1A, 1B or 1C.

These shaped elements 19, 20 could be made by a material resistant to erosion or corrosion (as for example metal or ceramic or polymers or other) and can also be used to further increase the mechanical resistance of the finished impeller. The shaped elements 19, 20 have to reproduce the shape of the vane, so they could be of the three or two dimensional types, or other types according to the shape of the particular vane in which they have to be associated. It should be noted that the shaped elements 19, 20 can be fixed inside the vane 13 by the filling material M and also by its shaped form in a simple and useful way.

Figure 9A:
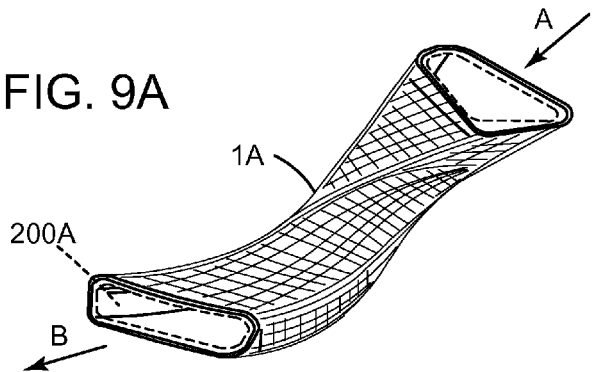

FIG. 9A shows the first fiber element 1A (see also FIG. 1A) that presents a shape reproducing approximately the shape of the vane 13. In this case, this element 1A could be made by any type of fibers—as described before—and it could be advantageously semi-elastic or conformable so as to enlarge itself to pass over the end regions 200B or 200C of the insert 200 and then to close around the central region 200A. In a further embodiment, the insert 200 could not include the end regions 200B, 200C. In another embodiment, the element 1A could be braided, or otherwise produced, directly onto the insert 200, so no fabric deformation would be required.

Figure 9B:
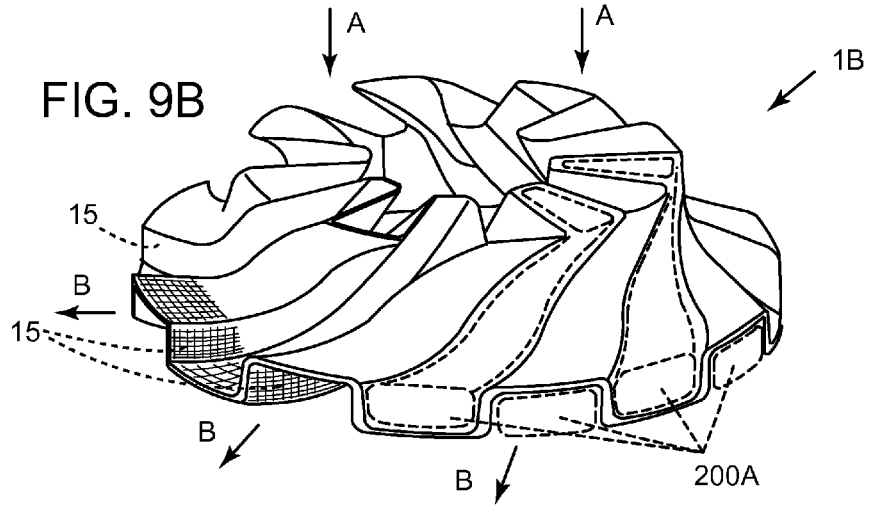

FIG. 9B shows the second fiber element 1B (see also FIG. 1B) that presents a shape configured to surround alternately the superior wall 13S of the vane 13 and the inferior wall 13I of an adjacent vane 13 passing along the respective blade 15 therebetween. In particular, this second element 1B is made substantially by a shroud plate shaped to form continuously all the vanes 13 of the annular assembly placing a vane insert 200 and the adjacent vane insert 200 opposed on its surface during the assembly of the mold 100.

Figure 9C:
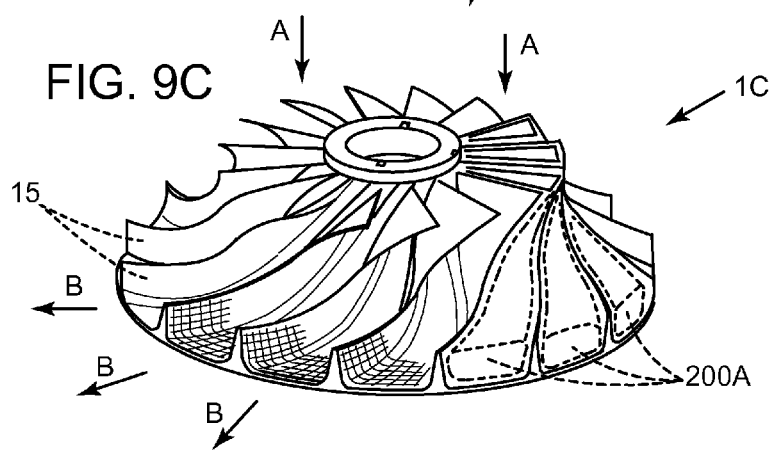

FIG. 9C shows the third fiber element 1C (see also FIG. 1C) that presents a configuration substantially made by an annular plate to form the superior or inferior wall 13S or 13I with blade surfaces stretching out from this plate to form the blade 15 of the finished impeller. The third fabric element 1C can be placed substantially above the annular insert 110 (as shown in FIG. 9C) or under the annular insert 110 (as shown in FIG. 1C) during the assembly of the mold 100.

Figure 10:
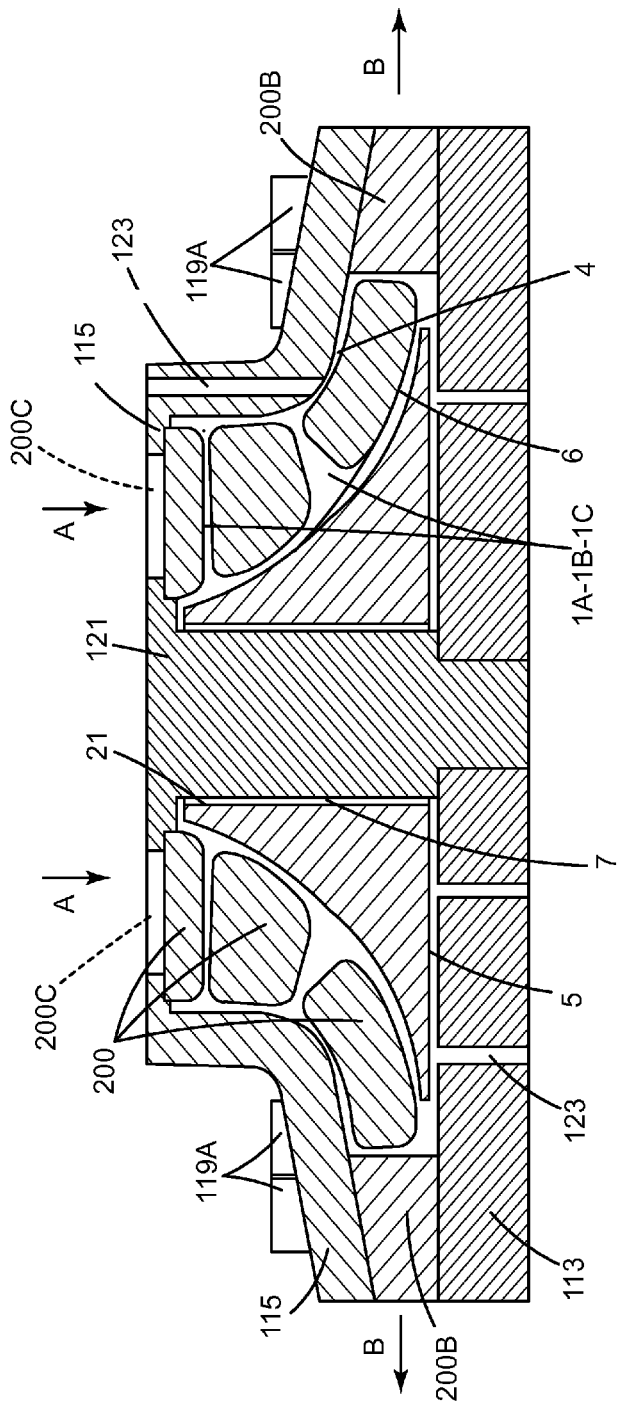
FIG. 10 shows a cross-section of the mold of FIG. 2 or 3.

FIG. 10 shows a schematic view of a cross-section of the mold 100 of FIGS. 2 and 3, in which you can see in particular the vane inserts 200 and the empty spaces inside which contains the fabric elements 1 to 7 and in which the filling material M is filled. In a particularly advantageous embodiment, the empty spaces are made so as to match or press together the fabric elements 1 to 7 are placed inside so that the adjacent fabric elements are strictly in contact each other.

This decreases the empty spaces between two adjacent fiber elements 1 to 7 as much as possible; the filling material M being able to fill the spaces between fibers of the same fiber element 1 to 7 in order to provide a high, and controlled, fiber volume fraction, see above; in particular, using a closed mold it is possible to control these spaces to provide a high, and controlled, fiber volume fraction.

The filling material M can be injected from a plurality of injection holes 123 made in the base plate 113 and/or in the upper-ring 115.

FIGS. 11A to 11L show a plurality of fibers that can be used to make the fiber elements 1A, 1B, 1C, 4, 5, 6, 7 or 37 according to different embodiments of the invention.

Figure 11A:
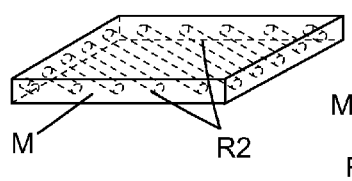

In particular, FIG. 11A shows a composite material comprising the filling material M inside which are enclosed a plurality of continuous fibers R2 which may be oriented in a preferential direction in order to have optimal strength distribution on the fiber elements during the use of the finished impeller.

Figure 11B:
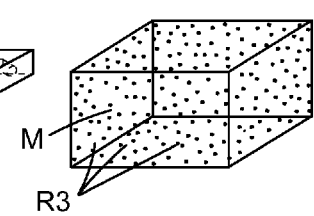
Figure 11C:
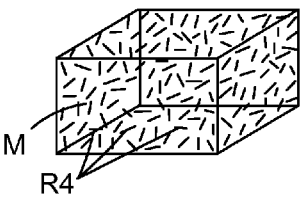
Figure 11D:
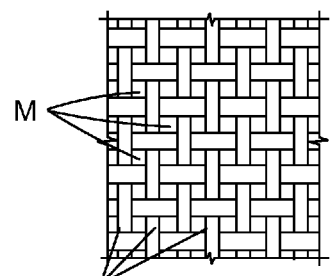
Figure 11E:
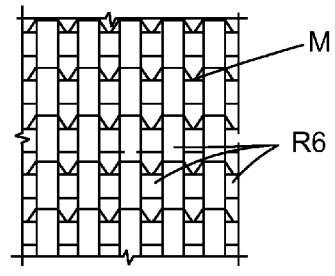
Figure 11F:
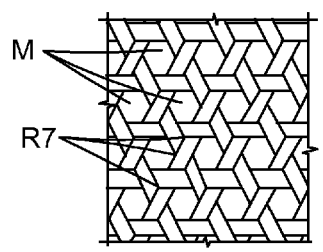
Figure 11G:
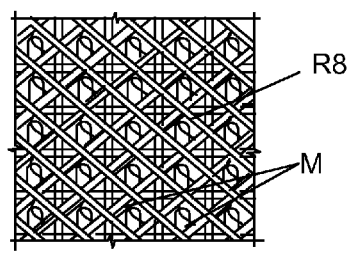
Figure 11H:
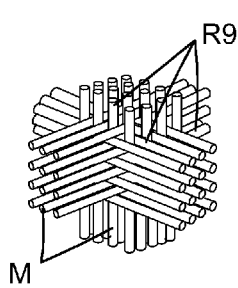
Figure 11I:
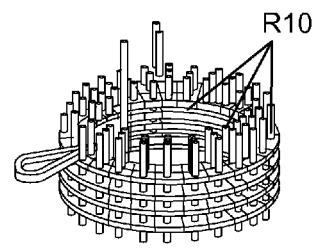
Figure 11L:
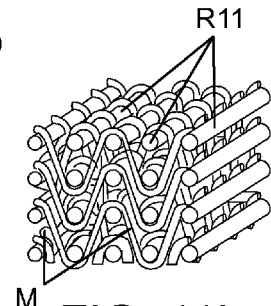

FIGS. 11B and 11C show composite materials composed of the filling material M inside which are enclosed a plurality of particle fibers R3 and respectively discontinuous fibers R4.

FIGS. 11D to 11L show respectively fibers composed of a biaxial mesh R5, a sewed mesh R6, a tri-axial mesh R7, a multilayer warping mesh R8, a three-dimensional twister fiber R9, a cylindrical three-dimensional mesh R10 and respectively a three-dimensional interwoven mesh R11. All these types of fibers or mesh can be variously oriented in order to have optimal strength distribution on the fiber elements.

It has to be noted that over the years many types of synthetic fibers have been developed presenting specific characteristics for particular applications that can be used according to the particular embodiments.

For example, the Dyneema® (also known as "Gel Spun Polyethylene, or HDPE) of the Company "High Performance Fibers b.v. Corporation" is a synthetic fiber suitable for production of cables for traction, and it is used for sports such as kite surfing, climbing, fishing and the production of armors; another fiber similar to the Dyneema is the Spectra® patented by an U.S. Company; and another fiber available on the market is the Nomex®, a meta-aramid substance made in the early sixties by DuPont.

According to an embodiment of the present invention, a method is provided for building a centrifugal impeller for a turbomachine, that comprises at least a step to fabricate an annular insert comprising a plurality of aerodynamic vane inserts, reproducing the aerodynamic vanes of the finished impeller such that the aerodynamic characteristics of the vanes and the finished impeller are preserved.

In an embodiment of the present invention, the method comprises a step to build a plurality of aerodynamic vane inserts made by said appropriate material, each of them reproducing at least an aerodynamic vane of the impeller and each configured to associate with each other to realize the annular insert.

In an alternative embodiment of the present invention, it provides a step to build the annular insert from a single piece using a specific mold.

In another embodiment of the invention, it provides a step to build a first fabric element able to be associated around each of the said aerodynamic vane inserts.

In yet another embodiment another step is provided to build a second fabric element able to be associated on an upper wall of a vane and on a lower wall of the adjacent vane of the annular insert.

Other steps may be provided to build a third fabric element able to form continuously a plurality of blade walls and a wall between the blades.

In another embodiment of the present invention, another step is provided to associate, at least, a shaped component on the external surface of each aerodynamic vane insert before associating the fabric element on it. In this way it is possible to enclose the shaped component between the aerodynamic vane insert and the respective fabric element.

In yet another embodiment of the present invention, another step is provided to associate an inner core under the annular insert in order to give a higher strength and stiffness during the work of the finished impeller at the high rotation velocities and, at the same time, to facilitate its construction providing a solid base for the fibers deployment.

The filling material could be filled inside the mold by an infusion process, such as resin transfer molding (RTM), vacuum assisted resin transfer moldling (VARTM), structural reaction injection molding (SRIM), reinforced reaction injection molding (RRIM), or others. It's clear that it does not exclude using other methods according to specific needs of construction or use.

In another embodiment, another step is provided to remove the annular insert after the infusion and curing process of the filling material. This could be achieved by flushing with liquid or gas, in the case of a soluble insert, heating, in the case of meltable insert, breaking, in the case of breakable insert, or designing the geometry of the annular insert such that it can be removed without change, in the case of solid insert. This removing step is such that the annular insert could be extracted or dissociated from the finished impeller after the infusion process in such a way that the aerodynamic characteristics of the vanes of the finished impeller are preserved.

In another embodiment, still another step is provided to fabricate all or portions of the aerodynamic vane inserts and of the annular insert using an additive manufacturing technique to minimize the need for machining the inserts. These additive manufacturing methods include, but are not limited to, stereolithography, fused deposition modeling, laser sintering, and electron beam melting. The choice of method will depend on many factors including the molding temperature and desired dimensional tolerances of the impeller. This is especially attractive for applications where small quantities of impellers with the same shape will be produced.

In yet another embodiment, all or portions of the insert would be cast using dies made with one of the additive manufacturing methods mentioned above. In this case, the insert material could consist of a ceramic that is soluble.

The finished impeller produced by the method according to embodiments of the present invention is of high quality and has the aforesaid innovative characteristics for the turbomachinery field.

Also, it is particularly easy to provide further phases to add components or elements to improve the quality or the mechanical characteristics of the finished impeller according to specific requirements.

The method according to embodiments of the present invention is extremely versatile, because it is possible to build different types of impellers, while preserving aerodynamic and mechanical characteristics thereof, for example two or three dimensional impeller or others.

The disclosed exemplary embodiments provide objects and methods to realize an impeller with innovative features. It should be understood that this description is not intended to limit the invention. On the contrary, the exemplary embodiments are intended to cover alternatives, modifications and equivalents, which are included in the spirit and scope of the invention as defined by the appended claims.

Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other example are intended to be within the scope of the claims if they have structural elements that do not differ from the literal language of the claims, or if they include equivalent structural elements with insubstantial differences from the literal languages of the claims.

What is claimed is:

1. A system comprising a mold for a centrifugal impeller for a turbomachine, the system comprising:
    at least one annular insert, wherein the at least one annular insert comprises a plurality of aerodynamic vane inserts configured to reproduce a plurality of aerodynamic vanes of a finished centrifugal impeller, wherein each of the plurality of aerodynamic vanes comprises lateral faces and at least one of an inferior face and a superior face; and
    wherein a shaped component encloses external surfaces of each of the aerodynamic vane inserts,
        wherein at least one of the plurality of shaped components become integral with at least three faces of each of the plurality of aerodynamic vanes.

2. The system comprising the mold of claim 1, wherein the at least one annular insert comprises a single piece or a plurality of pieces joined to each other.

3. The system comprising the mold of claim 1, further comprising at least one of
    a base plate having an internal face and an external face the internal face of the base plate being configured to reproduce a rear-surface of the finished centrifugal impeller and the external face of the base plate being substantially opposite to the internal face of the base plate;
    an upper-ring having an internal face and an external face, the internal face of the upper-ring being configured to reproduce as front-surface of the finished centrifugal impeller and the external face of the upper-ring being substantially opposite to the internal face of the upper-ring; and
    an inner core element associated under the at least one annular insert and over the base plate.

4. The system comprising the mold for the centrifugal impeller of claim 1, wherein the aerodynamic vane insert is configured to reproduce at least an aerodynamic vane of a finished centrifugal impeller.

5. The system comprising the mold for the centrifugal impeller of claim 4, wherein the shaped component is enclosed by a first fabric element.

6. The system comprising the mold for the centrifugal impeller of claim 5, wherein the shaped component is by a second fabric element.

7. The system comprising the mold for the centrifugal impeller of claim 6, wherein the shaped component is associated on the central region of the insert and is enclosed by a third fabric element.

8. The system comprising the mold for the centrifugal impeller of claim 4, wherein the aerodynamic vane insert is made by a single piece or by two or mere pieces.

9. The system comprising the mold for the centrifugal impeller of claim 4, wherein the aerodynamic vane insert is made by a soluble material, a breakable material, a reformable material, or a solid material that can be extracted in multiple pieces.

10. The system comprising the mold for the centrifugal impeller of claim 1, wherein each of the plurality of shaped components is realized by a first surface which reproduces the shape of the inferior face of an aerodynamic vane and where lateral edges reproduce partially the shape of lateral faces of a blade inside the vane.

11. The system comprising the mold for the centrifugal impeller of claim 1, wherein the aerodynamic vane inserts further comprise end regions, wherein and the end regions are configured to be adjacent to shaped end regions of an adjacent vane insert.

12. The system comprising the mold for the centrifugal impeller of claim 11, wherein end regions comprise lateral surfaces, which engage with the lateral surfaces of the adjacent vane insert.

13. The system comprising the mold for the centrifugal impeller of claim 1, wherein the plurality of shaped components are fixed inside the aerodynamic vanes by a filling material injected into the mold.

* * * * *